Figure 1:
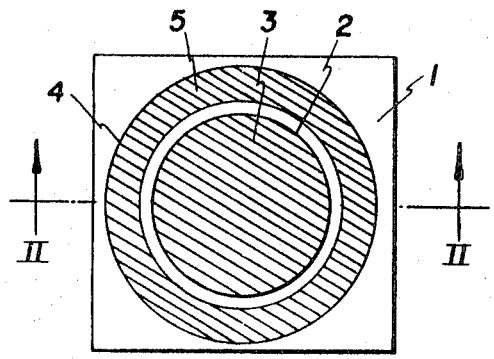

United States Patent
Cross et al.

[15] 3,663,815
[45] May 16, 1972

[54] METHOD AND APPARATUS FOR COUNTING RADIATION DAMAGE TRACKS IN SHEET MATERIAL USING A CAPACITIVE DISCHARGE DEVICE

[72] Inventors: William Gunn Cross, Deep River, Ontario; Luigi Tommasino, Toronto, Ontario, both of Canada

[73] Assignee: Atomic Energy of Canada Limited, Ottawa, Province of Ontario, Canada

[22] Filed: Apr. 23, 1969

[21] Appl. No.: 828,411

[30] Foreign Application Priority Data

Feb. 18, 1969 Canada..............................043,252

[52] U.S. Cl.............................................250/83.3 CD, 324/54
[51] Int. Cl...................................................G01t 1/02
[58] Field of Search.................250/83 R, 83 CD, 83.3 R; 324/54

[56] References Cited

UNITED STATES PATENTS

| | | | |
|---|---|---|---|
| 2,712,112 | 6/1955 | Weeks | 324/54 |
| 2,873,425 | 2/1959 | Huggins | 324/54 |
| 2,890,409 | 6/1959 | VanKrevelen | 324/44 |
| 2,894,204 | 7/1959 | Gambrill | 324/54 |
| 2,941,144 | 6/1960 | Cannon | 324/54 |
| 3,321,703 | 5/1967 | Tyszewicz | 324/54 |

Primary Examiner—James W. Lawrence
Assistant Examiner—D. C. Nelms
Attorney—James R. Hughes

[57] ABSTRACT

Fission fragment tracks produced in sheet mica and other electrical insulating materials of radiation dosimeters are counted by leaching the tracks so that they provide electrical discharge paths through the sheet, placing an aluminum foil on top of the sheet, applying a voltage between an electrode covering the underside of the sheet and the foil to sequentially puncture the foil by electrical discharges through the tracks and counting the discharges.

6 Claims, 2 Drawing Figures

Patented May 16, 1972

3,663,815

INVENTORS
WILLIAM G. CROSS
LUIGI TOMMASINO
BY J. R. Hughes
AGENT

METHOD AND APPARATUS FOR COUNTING RADIATION DAMAGE TRACKS IN SHEET MATERIAL USING A CAPACITIVE DISCHARGE DEVICE

This invention relates to a method of determining tracks of charged particle radiation in sheet material and apparatus therefor.

It is known that nuclear fission fragment tracks are produced in sheet mica and other electrically insulating materials when these materials are exposed to fission producing radiation which will release fission fragments to produce the tracks in the material. Radiation dosimeters are known which utilize this property of these materials, wherein after exposure of the material to the fission producing radiation to produce the tracks therein, the track-defining substance in the material is removed by leaching to form apertures in the material, and the number of apertures thus produced serves as a measurement of the concentration of fission producing radiation to which the material has been exposed.

One method of determining the number of apertures is to count them by eye under a microscope. To obtain the accuracy often required it may be necessary to count up to many thousands of tracks and so counting them by eye can be a tedious and time consuming procedure. Should the number of tracks per unit area be low this can also be tedious and time consuming because many microscope fields of view may have to be scanned to find each track. Instruments have been developed to scan and count the tracks automatically but these instruments are unduly complex and expensive.

It has also been proposed to determine the number of apertures by gas flow or ionic permeability. In both of these methods the number of apertures are measured simultaneously by either passing a gas through all of the apertures and measuring the rate of flow of the gas or by placing the sheet as a barrier between two halves of a cell containing an electrically conducting liquid and measuring the cell electrical conductivity. The main disadvantage of both of these methods is that the measurements are very sensitive to the sizes of the apertures as well as the number of them. Even with careful leaching of the fission fragment tracks there is quite a variation between the sizes of the apertures in a sheet, for example, the gas flow through one aperture may be 10 times that of another and so the accuracy of the measurement may not be adequate, particularly if the total number of holes is not large. It is the number of apertures which gives an indication of the concentration of fission producing radiation to which the material has been exposed.

In yet another method of determining the number of apertures quickly by the naked eye, an opaque coating of aluminum is applied to the sheet containing the tracks, so that during leaching of the tracks from the uncoated side of the sheet, the leaching solution attacks the aluminum. Thus each leached track is surrounded by a relatively large easily visible circular area from which aluminum has been removed. When the density of tracks per unit area of the sheet is low this method works well. Its limitation arises at relatively high track densities of the order of 100 per square centimeter because in this instance a large hole in the aluminum may overlap several small ones and obscure them.

It is an object of the invention to provide a method and apparatus for counting the number of fission fragment tracks wherein the number of fission tracks are counted accurately and more quickly than by known methods, and irrespective of the range of sizes of the apertures produced by leaching the tracks.

It is a further object of the invention to provide a method and apparatus for counting the number of fission tracks more accurately than by known methods in some instances where the density of the tracks per unit area of the sheet is sufficiently high to render some of these known methods unreliable or sufficiently low to render other of these known methods unreliable.

According to the invention there is provided an apparatus for counting radiation damage tracks, comprising a base of electrical insulating material, a first electrode plate member exposed on one side and supported by said base, a second electrode having an exposed surface in spaced relationship from said first electrode, first and second electrodes being electrically insulated from one another, an electrical resistance electrically connected to said first electrode, and an electrical impulse counter connected to said first electrode and said second electrode to count electrical impulses passing from said first electrode to said second electrode, whereby a sheet having damage tracks forming electrical discharge paths through the sheet and produced therein by heavy energetic particles, and an imperforate metal layer on one side of the sheet, may be disposed with said first electrode in contact with substantially the whole of the exposed side of the sheet, and said second electrode in electrical contact with a portion of said metal layer, so that said first electrode when having a voltage applied thereto through the said electrical resistance will cause electrical discharges sequentially through said tracks to progressively puncture the metal layer at substantially all of said damage tracks, and said counter will count the discharges.

Further according to the invention there is provided an apparatus for counting radiation damage tracks in sheet material, comprising a base of electrical insulating material a first electrode plate member exposed on one side and supported by said base, a second electrode having an exposed surface in spaced relationship from said first electrode, said first and second electrodes being electrically insulated from each other, a capacitor electrically connected to the said electrodes to discharge to the said first electrode, an electrical resistance electrically connected to the capacitor to substantially increase the capacitor electrical charging period beyond the electrical discharging period thereof, and an electrical impulse counter connected to said capacitor to count the electrical discharges thereof, whereby a sheet having damage tracks forming electrical discharge paths through the sheet and produced therein by heavy energetic particles, and an imperforate metal layer on one side of the sheet, may be disposed with said first electrode in contact with substantially the whole of the exposed side of said sheet, and said second electrode in electrical contact with a portion of said metal layer, so that the capacitor when electrically charged will discharge sequentially through said tracks to progressively puncture said metal layer at substantially all of said damage tracks, and said counter will record the number of electrical discharges.

Further according to the invention there is provided a method of counting radiation damage tracks in sheet material, comprising placing the sheet material, having damage tracks therein forming electrical discharge paths and a metal layer on one side between a first electrode in contact with the exposed side of said sheet, and a second electrode in contact with said metal layer, impressing a voltage on the said electrodes to cause electrical discharges sequentially through the material and generally along the radiation tracks, and counting the number of discharges, said metal layer being such that each electrical discharge taking place along a damage track punctures the metal layer at that damage track so that a second discharge will not occur along that damage track.

Figure 2:
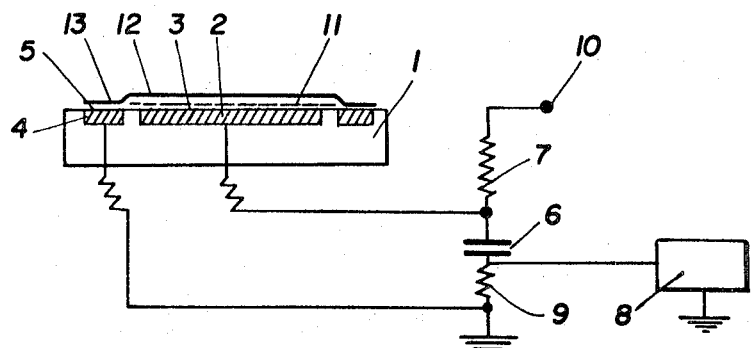

In the accompanying drawing which illustrates by way of example, an embodiment of this invention, FIG. 1 is a plan view of a base containing two electrodes of a radiation track counting apparatus, and FIG. 2 is a sectional side view along II—II, FIG. 1 with the electrical circuitry included.

Referring to FIGS. 1 and 2 there is shown a base 1 of an electrical insulating material in this instance a polymethylmethacrylate resin, a first or inner electrode plate member 2 exposed on one side 3 and supported by the period A second or outer electrode 4 having an exposed surface 5 surrounding the exposed side 3 of the inner electrode 2 in space relationship therefrom.

The inner electrode 2 and outer electrode 4 are of brass or nickel and are electrically insulated from each other by being embedded or inset into the base 1 to lie flush with its top side face.

A capacitor 6 is electrically connected to the inner electrode 2 and the outer electrode 4 to discharge to the inner electrode 2, and an electrical resistance 7 is electrically connected to the capacitor 6 to substantially increase the charging period of the capacitor 6 beyond the discharge period thereof. An electrical impulse counter 8 is connected to the capacitor 6 to count the electrical discharges thereof.

An electrical resistance 9 is connected to the capacitor 6 so that the discharge current will develop a voltage pulse which can conveniently be counted. Other methods of detecting or counting the current of the discharges or the light produced by them could be used.

In operation a thin sheet 11 (shown dashed) of, for example, a plastic material or mica having leached, damage tracks having been produced by heavy energetic particles, and an, electrical discharge puncturable metal layer 12 on one side of the sheet 11 is disposed with the inner electrode 2 in contact with substantially the whole of the exposed underside of the sheet 11. The outer electrode 4 is placed in electrical contact with a portion 13 of the metal layer 12, which extends around the sheet 11. To this end an annular clamping member (not shown) which overlies the outer electrode 4 may press the portion 13 on to the outer electrode 4.

The capacitor 6 then has a high voltage applied to it through the terminal 10 and resistance 7 so that the capacitor 6 becomes charged, will discharge sequentially along the tracks through the sheet 11 to progressively puncture the metal layer 12 at substantially all of the damage tracks, and the counter 8 will record the number of electrical discharges.

When measuring alpha particles a cellulose nitrate sheet of between 5 and 10 microns in thickness may be used as the damage track producing material. When measuring fission fragments a mica sheet of between 2 and 5 microns in thickness may be used instead of plastic material. A typical thickness for the aluminum metal layer 12 is between 0.1 and 3.0 microns. It will be appreciated that the thickness of the metal layer 12 has to be matched with the voltage applied to the terminal 10 and the capacitance of the capacitor 6 so that the metal layer 12 will be punctured over a large enough area to prevent a second discharge from ocurring at the same place.

For the materials given above the capacitor 6 may have a capacitance in the order of 200 or 300 pico-farads, and the voltage applied to the terminal 10 may be of the order of between 400 and 1,000 volts. The resistance 7 may have a value of 470 K and the resistance 9 may have a value of 100 ohms so that the capacitor 6 will discharge through a track in the sheet 11, will recharge over a period sufficiently long so that the discharge will be quenched, and will then discharge through another track. This operation will continue until all of the tracks have received a discharge and have punctured the metal layer 12.

An alternative for the metal layer 12 is a commercially available aluminized polyester film. In this instance the polyester film provides a support for the aluminum and is uppermost.

The electrical impulse counter 8 may be of the type known as a scaler or other known types for counting voltage pulses.

It will be appreciated that resistance 9 may be placed in other positions in the circuit and in some instances may not be necessary. It will also be appreciated that the capacitance between the inner electrode 2 and the outer electrode 4 produced by the sheet 11 in practice effectively adds to that of the capacitor 6. If this capacitance produced by the sheet 11 is of sufficient magnitude it may be possible to omit the capacitor 6 from the circuit.

In a different embodiment the outer electrode 4 may be positioned above the base 1 and movable towards it so that the outer electrode 4 can also be used to clamp the portion 13 of the metal layer 12 against the base 1. In this instance the portion 13 of the metal layer 12 will be disposed between the outer electrode 4 and the base 1.

In some instances it may be desirable to puncture the damage tracks in the sheet 11, by a high voltage electrical discharge, before the metal layer 12 is placed thereon to be punctured. This will ensure that the metal layer 12 will be punctured at substantially all of the damage tracks.

The purpose of the capacitor 6 and resistance 7 is to remove most of the voltage between the electrodes 2 and 4 after an electrical discharge has taken place between them, and to prevent a voltage being applied between them for a predetermined short period. Other electrical circuits could be used, using an electron tube or transistor as a means of connecting the capacitor 6 to a source of high voltage, and which would replace resistance 7. Such electrical circuits will readily occur to persons skilled in the art.

We claim:

1. Apparatus for counting radiation damage tracks in sheet material, comprising a base of electrical insulating material, a first electrode plate supported by said base and exposed on one side for contact with substantially the whole of an exposed side of a sheet having electrical discharge paths formed through it along heavy energy particle produced damage tracks, a second electrode for contact with a portion of an electrical discharge puncturable metal layer on a covered side of said sheet, an electrical resistance connected to said first electrode to increase an electrical charging period between said first electrode for sequential electrical discharging through each of said damage tracks, and an electrical impulse counter connected to said electrodes for counting electrical discharges through said damage tracks.

2. Apparatus according to claim 1, which includes a capacitor connecting said electrical resistance to said first electrode.

3. Apparatus according to claim 2, which includes an electrical resistance connecting said capacitor to said second electrode and said counter.

4. Apparatus according to claim 2, wherein said electrodes are embedded in said base to lie flush with a side face.

5. A method of counting radiation damage tracks in sheet material, comprising placing the sheet material, having damage tracks therein forming electrical discharge paths and a metal layer on one side between a first electrode in contact with the exposed side of said sheet and a second electrode in contact with said metal layer, impressing a voltage on the said electrode to cause electrical discharges sequentially through the material and generally along the radiation tracks, and counting the number of discharges, said metal layer being such that each electrical discharge taking place along a damage track punctures the metal layer at that damage track so that a second discharge will not occur along that damage track.

6. A method according to claim 5, wherein said electrical discharges are produced by electrically charging a capacitor through an electrical resistance, and said electrical resistance increases the capacitor electrical charging period to a period sufficient for the electrical discharges to be quenched.

* * * * *